Patented Dec. 12, 1950

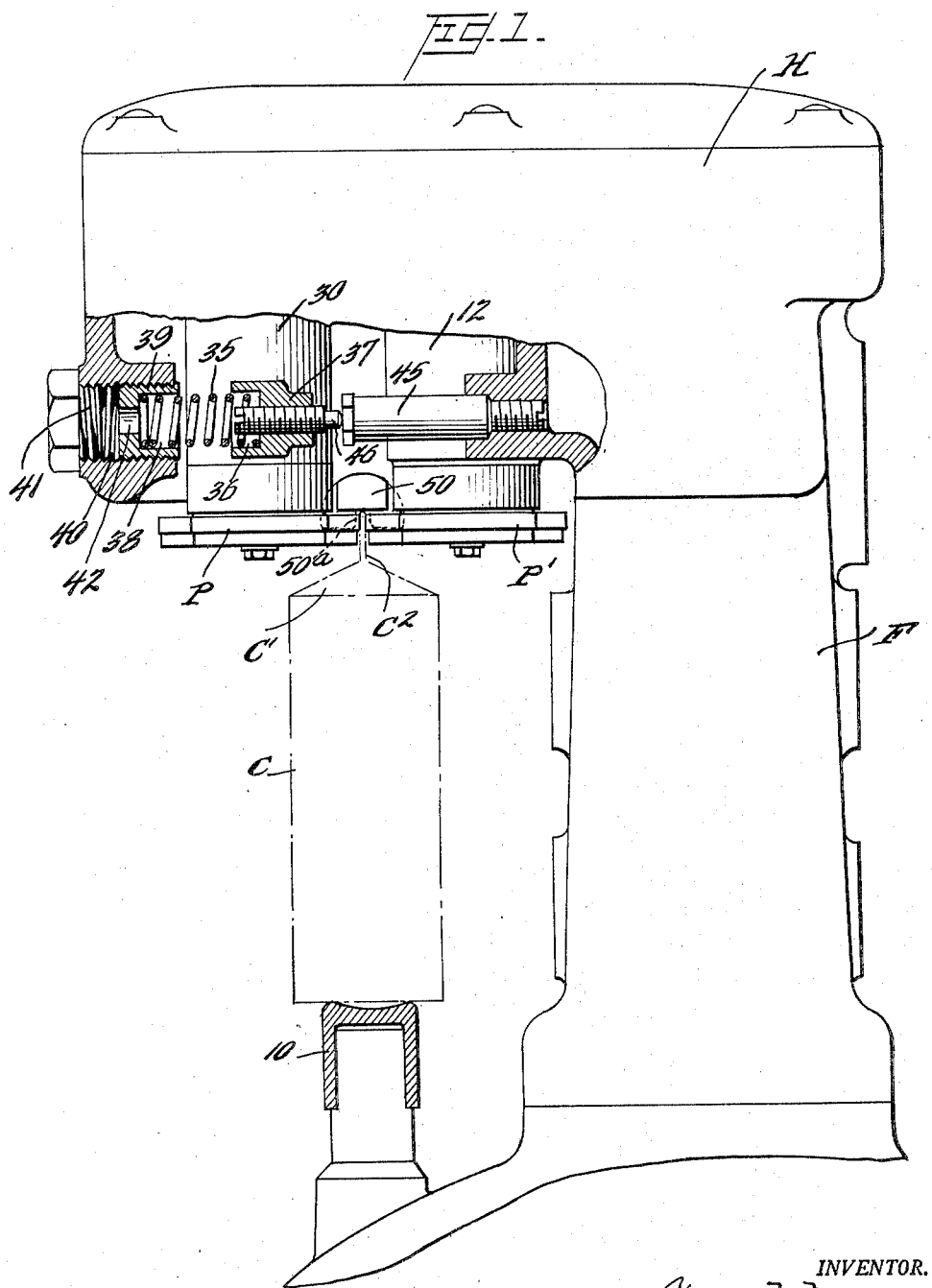

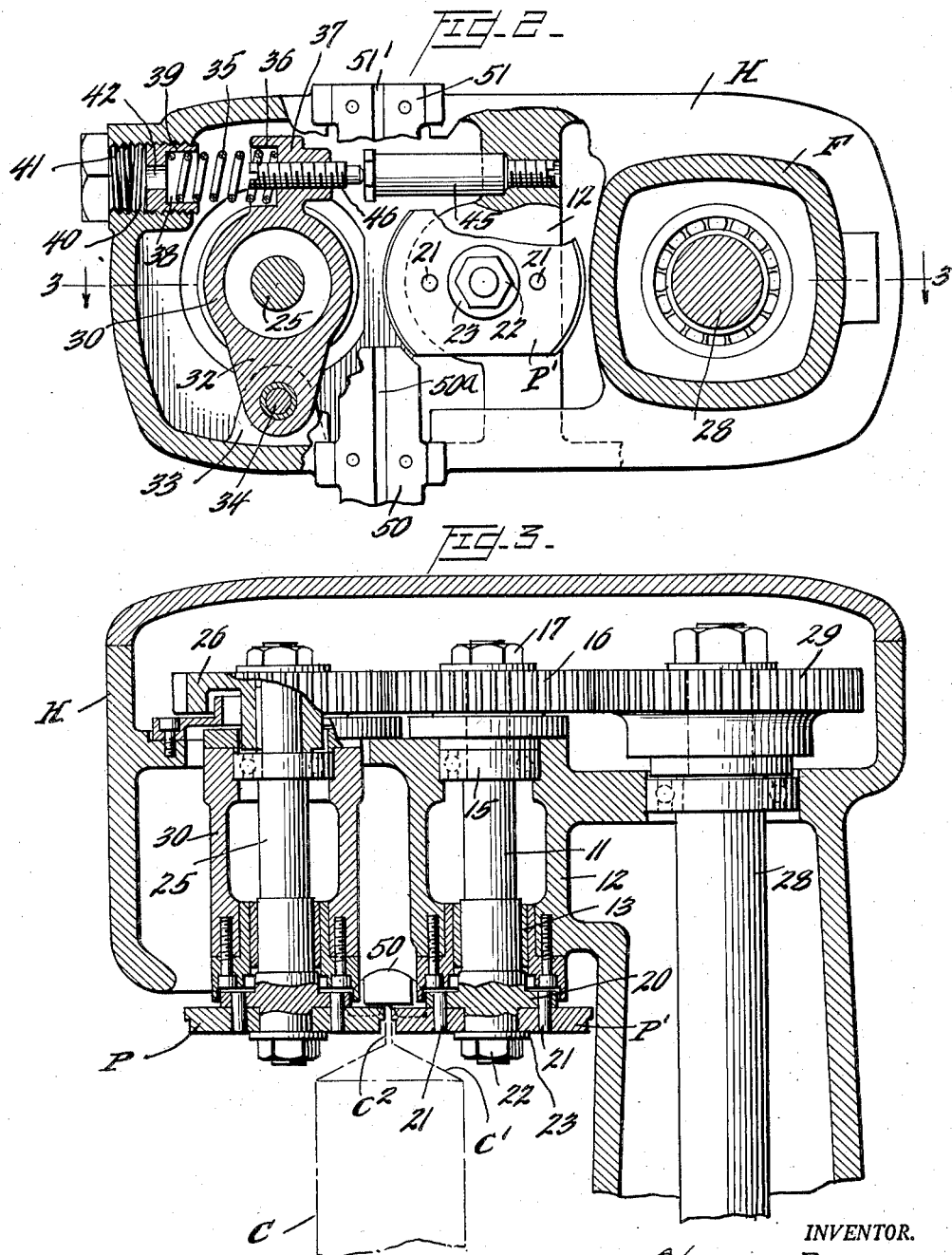

2,533,832

UNITED STATES PATENT OFFICE 2,533,832

SEALING MECHANISM

Charles Z. Monroe, Detroit, Mich., assignor to Ex-Cell-O Corporation, Detroit, Mich., a corporation of Michigan Application October 14, 1947, Serial No. 779,682

1 Claim. (Cl. 154—42)

The final step in the process of forming, coating, charging and closing paper fluid containers of the type disclosed and claimed in Patent Number 2,047,891, issued to Henry T. Scott, consists in applying to the terminal rib sufficient compressive force to cause the several plies of that rib, which have previously been coated with a waterproofing compound such as wax, to closely adhere to each other so that these several plies together form a stiff, rigid, structurally strong portion of the container completely without interstices through which any portion of the liquid content thereof may escape. The mechanism for performing such final sealing operation which has heretofore been most generally employed has included flat opposed relatively movable dies or pressure elements together with mechanism for reciprocating at least one of such elements and causing it to move in a path directly toward and away from the opposing element. In the usual case such sealing mechanism has comprised portion of a complete automatic machine for the initial squaring out of paper blanks, coating of partially completed containers, closing, stapling and sealing the same, closed containers being advanced along a predetermined pathway by a conveyor and the terminal rib of each successive container being passed between the relatively movable sealing dies and, while stationary, being subjected to the pressure of such dies. The conveyor employed is of the intermittently operating type since it is necessary for the container to remain stationary while the rib is thus subjected to sealing pressure.

In accordance with the present invention an improved sealing mechanism is provided whereby, in lieu of flat work engaging elements, at least one of which is mounted for reciprocation, two sealing elements of rotary type are substituted so that the work need not be halted while being subjected to the sealing operation, the time necessary for the carrying out of that operation is reduced and the conveyor means employed is of the convenient continuously operating type. The actual sealing operation is performed in an improved manner so that the ultimate product is a container rib which is thoroughly resistant to the shocks incident to handling and will not permit leakage under any circumstances, the mechanism works more smoothly, having no reciprocating parts, and the compressive forces, being gradually applied by rolling contact rather than by the application of a hammerlike blow, do not cause vibration and have no tendency to disturb any mechanism positioned nearby and mounted upon the same base or frame. Because of the substitution for reciprocating work engaging elements of the rotary work engaging elements of the present invention desirable simplification in the mechanism for applying the compressive forces may be effected, the number of parts substantially reduced and the design being such that the mechanism may remain in operation for long periods of time upon an automatically operating machine without requiring attention, adjustment or repair. Variation in thickness of the work to be acted upon presents no difficulty, the rotatable sealing elements being yieldingly held against movement or separation, the yielding means being so adjusted as to apply the necessary sealing pressure to each article of work passing therebetween but permitting the sealing members to separate slightly when and if an article of greater than normal thickness enters the pass between them.

One form of the invention, selected by way of example for the purpose of disclosure, is illustrated in the accompanying drawings in which, Figure 1 is a side elevation, partly broken away, of the improved sealing mechanism;

Figure 2 is a bottom plan view of the same, also partly broken away to show certain of the interior elements; and Figure 3 is a section on line 3—3 of Figure 2.

In Figures 1 and 3 of the drawings there is illustrated, in chain lines, the outline of a container C which is generally of the type disclosed in the Scott patent previously mentioned, comprising a tubular body portion which is square in cross section, a flat, closed bottom and a top portion, generally indicated at $C^1$, comprising relatively folded stiff panels defining a container top of the "gable" type which terminates in a multi-ply rib $C^2$. The several panels of the rib are preferably united by stapling and the mechanism of the present invention is then employed to compress the rib into a single solid leak-resisting member, the sealing elements being also utilized, if this is desired, to imprint upon the opposite faces of the rib any lettering or information thought to be desirable, as for instance the date or day of the week when the container was actually sealed.

During the time that the rib $C^2$ of the container is undergoing the sealing operation the container is supported upon a conveyor the elongated stationary container base supporting portion of which is indicated at 10 in Figure 1, and which is disposed at right angles to the plane of the paper. The containers are advanced in a continuous manner and at the desired rate of speed by a container advancing means the details of which form no portion of the invention, but which will be understood to move the containers longitudinally of the stationary support 10 and to hold them erect so that the several ribs $C^2$ of the successive containers pass between the rotary pressure applying elements indicated at P and $P^1$ in the drawings, by which the sealing pressure is applied.

The pressure rollers P and $P^1$ are supported and positively actuated by mechanism housed within the pedestal F which pedestal is mounted upon a suitable frame, not illustrated, and which supports the housing H which extends laterally of the pedestal so as to overhang the trackway 10 and the path of movement of the series of containers C advancing along that trackway (in a direction normal to the paper). The sealing roller $P^1$ is mounted upon the lower end of a spindle 11 which is vertically disposed and concentric with a sleevelike portion 12 of the housing H, the spindle being freely revoluble about a fixed axis, being embraced adjacent its lower end by bearing 13 and supported adjacent its upper end by roller bearing 15.

A gear 16 is mounted upon the upper end of spindle 11 and is keyed thereto, a nut 17 threaded to the upper end of the spindle holding the gear and spindle against relative movement axially of the spindle. Toward the lower end of the spindle is located a spindle collar or head 20, rotatable with the spindle at all times, the spindle head being provided with apertures for the reception of pins 21 carried by the sealing member $P^1$. It will be observed that the sealing member $P^1$ is provided with a central aperture through which the spindle extends and that it is held in the position in which it is illustrated by means of a nut 22 and washer 23, the nut being threaded on the spindle and the washer closely engaging the undersurface of the sealing member $P^1$. When so positioned the pins 21 transmit the rotary motion of the spindle to the sealing wheel $P^1$ so long as the spindle is caused to rotate by force supplied to the gear 16 but the sealing wheel $P^1$ may readily be removed for inspection, repair or for the purpose of substituting therefor another sealing roller having a different legend inscribed on its periphery, by removing the nut 22.

The second spindle 25 is similarly formed and to its upper end is keyed a second gear 26 the teeth of which mesh with those of gear 16 so that, when gear 16 is driven, spindles 11 and 25 will be revolved in opposite directions. Gears 16 and 26 are preferably the same in diameter and sealing members P and $P^1$ are likewise preferably equal in diameter so that the peripheral speeds of the sealing wheels will be identical. Power for driving gears 16 and 26 is obtained from a power shaft 28 which has keyed to its upper end a driving gear 29 which is in constant mesh with gear 16 previously referred to. The peripheral speeds of the sealing wheels P and $P^1$ are preferably the same as the speed of movement of the work passing along the conveyor so that the position of a container being acted upon, with respect to the conveyor upon which it is supported, will not be changed or modified by the action of the sealing mechanism.

It will be observed that the sleevelike support 30 for the bearings which carry the spindle 25 is mounted for bodily movement toward and away from the frame portion 12 in which the spindle 11 is rotatably supported, so that the sealing wheel P may recede from or move toward the sealing wheel $P^1$. This construction may most clearly be observed in Figure 2, a horizontally extending lug 32 integral with sleeve 30 being there shown to be pivotally attached to vertically spaced lugs 33 (only the uppermost of which is shown), integral with the housing H, by means of a pivot member 34. Bodily swinging movement of sleeve 30, sealing wheel P and gear 26 about the axis of spindle 34 may thus occur and, associated with the sleeve 30 and the operating parts mounted thereon, is means for resiliently urging this sleeve toward the fixed sleeve 12 and a stop device for limiting the movement of sleeve 30 and wheel P under the influence of the resilient means.

Thus a relatively heavy helical spring 35, which is normally compressed, has one end received within a cylindrical recess 36 formed in a lug 37 rigid with sleeve 30 and extending outwardly therefrom in a direction opposite to that in which the lug 32 extends, the opposite end of spring 35 being received within a cylindrical recess 38 formed in a plug 39 which has threaded engagement with the interiorly threaded cylindrical aperture 40 formed in the housing H, the outer end of cylindrical aperture 40 being normally closed by a second plug 41. The member 39 is provided with a central aperture 42 within which a tool may be inserted after plug 41 has been removed and by means of which tool member 39 may be rotated and its position in threaded aperture 40 changed to increase or decrease the pressure of the spring against plug 39 as desired. A stop member is indicated at 45 and a stop engaging part associated with sleeve 30 is indicated at 46. Ordinarily the stop 45 will remain in fixed position as shown, having threaded engagement with a fixed portion of the housing. The stop contacting member 46 is longitudinally adjustable, its threaded exterior engaging the threaded interior of the aperture in lug 37 through which it passes. By the insertion of a tool through the aperture 42 in member 39, after removal of plug 41, the position of the stop engaging end of the contact member 46 may be varied, the opposite end of member 46 being slotted or otherwise provided with an aperture for the reception of an adjusting tool such as a screwdriver.

Ordinarily the stop is adjusted to such position that the peripheries of the sealing wheels P and $P^1$ will be quite close to each other when no work is passing between them, the thickness of the work being substantially greater than the distance between the work engaging rollers. When the rib of the container enters the pass between rollers P and $P^1$ these rollers will be spread apart against the heavy resistance of the spring 35, the spring pressure being sufficiently great to cause the rollers to exert the necessary force against the opposite faces of the container rib and thus secure the desired compression of that rib and the desired printing upon its surface of any legend to be placed thereon. The rolling action is silent but positive. Movements of the movable roller P relatively to the stationary roller $P^1$ during the operation of the machine will not have the effect of disengaging driving gears 16 and 26 as such movements are of such limited extent, the variations in thickness of the ribs of the containers being processed being measured only in thousandths of an inch. If desired guides for insuring accuracy of movement of the successive container ribs into the pass may be provided, portion of such a guide being indicated at 50, the undersurface thereof being provided with a container rib receiving guide slot 50a. A second guide 51 having an aligned guide slot 51a may be positioned to receive the ribs of containers which have just been acted upon by the rollers. The rollers themselves may have continuous cylindrical work engaging surfaces or may have segmental work engaging surfaces, the roller P¹ shown in plan in Figure 2 being of this latter type. The actual work engaging portions of the rollers may be separately formed and attached metal members, bearing indicia if desired, for instance hardened steel blocks.

It will be appreciated by those skilled in the art that, while the mechanism described is particularly suitable for use in the compression and sealing of the terminal ribs of containers of the type described, it may be used in the application of sealing pressures to articles of somewhat different nature and that, in adapting the same, minor changes may be made in the design and arrangement of the component elements of the mechanism.

Having thus described the invention, what is claimed as new and desired to be secured by Letters Patent is:

A machine of the class described comprising, in combination, two rotary sealing members together defining a pass for work to be acted upon, spindles upon which said members are mounted, a frame, spindle supports carried by the frame, one of said supports being mounted on the frame for arcuate movement about an axis toward and away from the other support, and means for maintaining said movable support in desired relation to the second support while permitting separation of said supports when the sealing members are forced apart by the work, said means including a stop member, a stop engaging part and a spring disposed in coaxial relationship along a line offset from said movable spindle support and generally tangential to an arc centered on said axis at the outer end of a radius extending from said axis and passing through said movably mounted spindle, the movable support having an extension upon which the stop engaging member is supported for longitudinal adjustment, the stop being mounted on an adjacent portion of the frame and the spring is interposed between said extension and a second frame portion.

CHARLES Z. MONROE.

REFERENCES CITED

The following references are of record in the file of this patent:

UNITED STATES PATENTS

| Number | Name | Date |
| --- | --- | --- |
| 1,686,810 | Greene | Oct. 9, 1928 |
| 2,308,589 | Davis | Jan. 19, 1943 |
| 2,343,975 | Hosfield | Mar. 14, 1944 |
| 2,376,253 | Humphrey | May 15, 1945 |
| 2,385,583 | McLauchlan | Sept. 25, 1945 |